US012694595B2

(12) United States Patent
Ding et al.

(10) Patent No.: US 12,694,595 B2
(45) Date of Patent: Jul. 28, 2026

(54) METHOD AND DEVICE FOR SYNTHESIZING TALKING HEAD VIDEO AND COMPUTER-READABLE STORAGE MEDIUM

(71) Applicant: UBTECH ROBOTICS CORP LTD, Shenzhen (CN)

(72) Inventors: Wan Ding, Shenzhen (CN); Dongyan Huang, Shenzhen (CN); Xianjie Yang, Shenzhen (CN); Zehong Zheng, Shenzhen (CN); Penghui Li, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 109 days.

(21) Appl. No.: 18/736,552

(22) Filed: Jun. 7, 2024

(65) Prior Publication Data
US 2024/0428493 A1      Dec. 26, 2024

(30) Foreign Application Priority Data

Jun. 26, 2023    (CN) .......................... 202310764110.4

(51) Int. Cl.
| | |
|---|---|
| *G06T 13/40* | (2011.01) |
| *G06T 7/73* | (2017.01) |
| *G06V 10/44* | (2022.01) |
| *G06V 40/16* | (2022.01) |
| *G06V 40/20* | (2022.01) |
| *G10L 15/02* | (2006.01) |

(52) U.S. Cl.
CPC ................ *G06T 13/40* (2013.01); *G06T 7/73* (2017.01); *G06V 10/44* (2022.01); *G06V 40/168* (2022.01); *G06V 40/20* (2022.01); *G10L 15/02* (2013.01)

(58) Field of Classification Search
CPC .......... G06T 13/40; G06T 7/73; G06V 10/44; G06V 40/168; G06V 40/20; G06V 40/171; G06V 40/161; G06V 40/174; G10L 15/02; G10L 2021/105; G10L 21/10

See application file for complete search history.

(56) References Cited

U.S. PATENT DOCUMENTS

| | | | |
|---|---|---|---|
| 12,050,854 B1 * | 7/2024 | Shan ........................ | G06F 40/40 |
| 2017/0011264 A1 * | 1/2017 | Smolic ................. | G11B 27/105 |
| 2022/0148583 A1 * | 5/2022 | Decrop ................ | G06N 3/0455 |
| 2022/0172710 A1 * | 6/2022 | Brady .................... | G06N 3/047 |
| 2025/0315631 A1 * | 10/2025 | Waibel ................... | G10L 21/10 |

* cited by examiner

*Primary Examiner* — Grace Q Li

(57) ABSTRACT

A method for synthesizing a talking head video includes: obtaining speech data to be synthesized and observation data, wherein the observation data is data obtained through observation other than the speech data; performing feature extraction on the speech data to obtain speech features corresponding to the speech data, and performing feature extraction on the observation data to obtain non-speech features corresponding to the observation data; performing temporal modeling on the speech features and first non-speech features to obtain low-dimensional representations, wherein the first non-speech features are non-speech features that are sensitive to temporal changes; and performing video synthesis based on the low-dimensional representations and second non-speech features, wherein the second non-speech features are non-speech features insensitive to temporal changes.

19 Claims, 3 Drawing Sheets

110

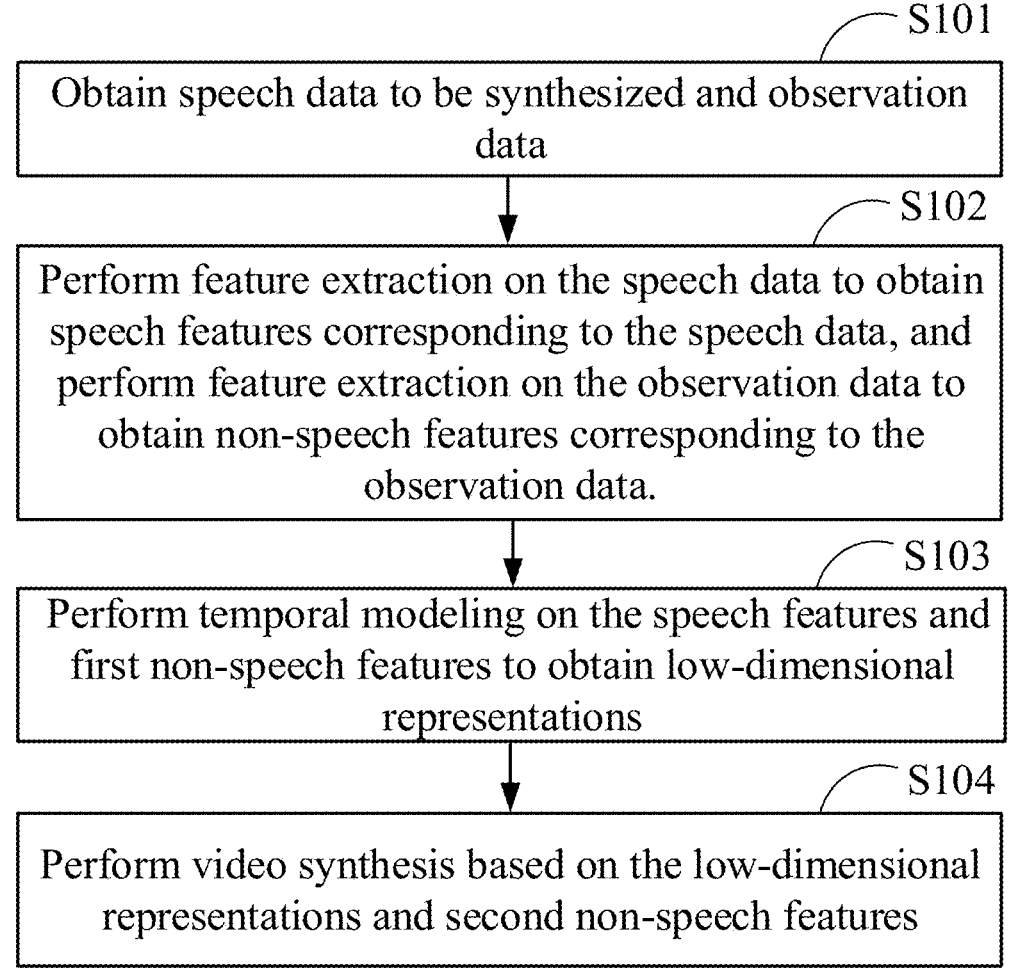

S101

Obtain speech data to be synthesized and observation data

S102

Perform feature extraction on the speech data to obtain speech features corresponding to the speech data, and perform feature extraction on the observation data to obtain non-speech features corresponding to the observation data.

S103

Perform temporal modeling on the speech features and first non-speech features to obtain low-dimensional representations

S104

Perform video synthesis based on the low-dimensional representations and second non-speech features

FIG. 2

METHOD AND DEVICE FOR SYNTHESIZING TALKING HEAD VIDEO AND COMPUTER-READABLE STORAGE MEDIUM

CROSS REFERENCE TO RELATED APPLICATIONS

This application claims priority to Chinese Patent Application No. CN 202310764110.4, filed Jun. 26, 2023, which is hereby incorporated by reference herein as if set forth in its entirety.

TECHNICAL FIELD

The present disclosure generally relates to video processing, and in particular relates to a video frame feature extraction method, device and computer-readable storage medium.

BACKGROUND

With the advancement of artificial intelligence, the concept of virtual humans has become increasingly familiar. It specifically refers to digitally created characters that closely resemble human appearance, utilizing digital technology. Currently, a common technology related to virtual humans is talking head video synthesis. This refers to generating a multimodal video of a talking head based on a given text and a specified facial image; in other words, the synthesized video includes synthesized speech and facial motion when speaking.

However, some conventional methods of talking head video synthesis rely on autoregressive models to establish dependencies between video frames, which leads to higher complexity and longer synthesis times, especially for synthesis based on high-resolution images.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a method for synthesizing talking head video according to one embodiment.

DETAILED DESCRIPTION

Figure 1:
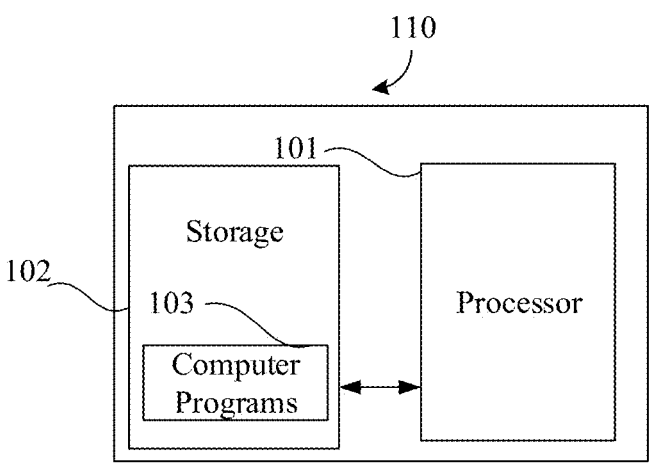
FIG. 1 is a schematic block diagram of an electronic device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 shows a schematic block diagram of an electronic device 110 according to one embodiment. The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for synthesizing talking head video, such as steps S101 to S104 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 3:
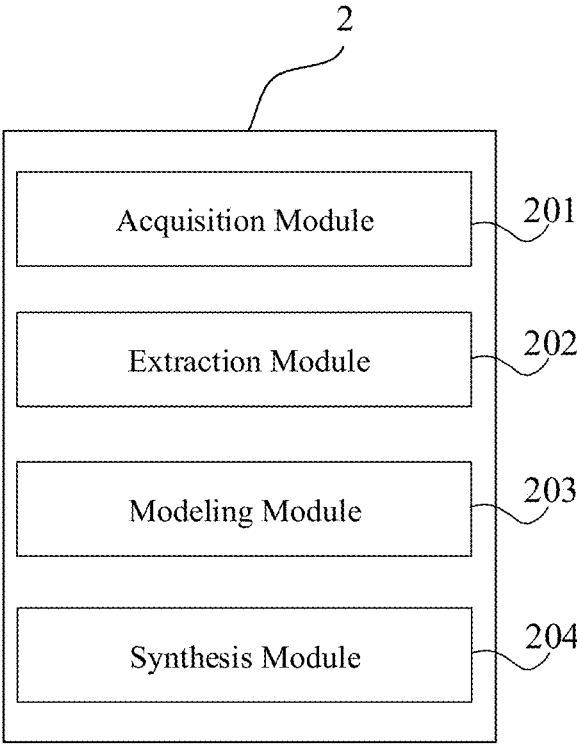
FIG. 3 is a schematic block diagram of a talking head video synthesis according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into an acquisition module 201, an extraction module 202, a modeling module 203, and a synthesis module 204 as shown in FIG. 3.

It should be noted that the block diagram shown in FIG. 1 is only an example of the device 110. The device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a method for synthesizing talking head video according to one embodiment. As an example, but not a limitation, the method can be implemented by the device 110. The method may include the following steps.

Step S101: Obtain speech data to be synthesized and observation data.

When synthesizing a talking head video, the electronic device can obtain the speech data to be synthesized and observation data. Specifically, the speech data to be synthesized refers to the audio data that the user desires to be output in the final synthesized talking head video. Observation data refers to other necessary data required for synthesizing the talking head video, apart from the speech data. It includes data related to appearance and head movement. Typically, the observation data can be obtained through sensors.

In some examples, the observation data can be obtained by taking a video of the real head of the desired target with a visual sensor. It can be understood that the video of the real head includes data related to appearance and data related to head movement. In some embodiments, the data related to head movement can be expressed through the video of the real head, and then the data related to appearance can be expressed through other facial images. That is, the real head can only provide data related to the head movement, and on this basis, the visual sensor captures the facial images of the desired target to provide data related to the appearance, which is not limited in the embodiments of the present disclosure.

Step S102: Perform feature extraction on the speech data to obtain speech features corresponding to the speech data, and perform feature extraction on the observation data to obtain non-speech features corresponding to the observation data.

The speech data, in addition to the speech intended to be output by the talking head video, may further include other noise data or redundant data, such as background noise and timbres. Similarly, the observed data may also include other noise or redundant data. Based on this, the electronic device can perform feature extraction on the speech data and observation data, respectively, to remove these noise data and redundant data, thereby avoiding affecting the subsequent talking head video synthesis.

Step S103: Perform temporal modeling on the speech features and first non-speech features to obtain low-dimensional representations.

In one embodiment, the first non-speech features are non-speech features with first sensitivity to temporal changes. In some examples, it can be seen from the analysis of talking head videos that human eyes are sensitive to the synchronization of lip movements with speech, and are sensitive to the naturalness of temporal changes in the contours of the head and shoulders. Based on this, the first non-speech feature can be set as a shape-related feature. Based on this, the first non-speech features can be set as shape-related features.

The electronic device can first fuse the speech features and the first non-speech features, and then use the autoregressive temporal model to perform temporal modeling based on the fused speech features and the first non-speech features starting from frame 0, thereby obtaining low-dimensional representations. It can be understood that these low-dimensional representations have corresponding physical meanings, such as key points on human faces. Based on this step, accurate modeling of shape-related information (such as contours and lip movements) in low-dimensional space can be ensured. It should be noted that although appearance-related features are non-speech features that are insensitive to temporal changes, they need to be used as one of the inputs of the autoregressive temporal model. In other words, the appearance-related features can be considered as global variables.

Step S104: Perform video synthesis based on the low-dimensional representations and second non-speech features.

In one embodiment, the second non-speech features are non-speech features with second sensitivity to temporal changes. The second sensitivity is less than the first sensitivity, meaning that the first non-speech features are more sensitive to temporal changes than the second non-speech features. In some examples, it can be seen from the analysis of talking head videos that human eyes are not sensitive to the naturalness of changes in texture details of hair and clothes. Based on this, the second non-speech features can be set as a texture-related features.

After obtaining the low-dimensional representations, a talking head video frame can be synthesized in parallel based on the low dimension and the second non-speech features, thereby obtaining the talking head video frame. Through the process above, multiple talking head video frames are continuously inferred to obtain the final talking head video. Specifically, during the video synthesis process, due to the characteristic that the second non-speech features are insensitive to temporal changes, they can be approximately defined as a constant; that is, temporal effects on the second non-speech features are not considered.

In one embodiment, the observation data includes head movement observation data expressed through video. Regarding this head movement observation data, the electronic device can extract the corresponding non-speech features through the following process: analyzing the video to obtain information on relative positional changes between a human face and a camera angle; and obtaining third non-speech features expressing a position of the human face based on the information.

When the head moves, the position of each key point on the face in the video will change. Based on this, the position changes of each key point on the face in the video can be analyzed, thereby obtaining the head posture change information (i.e., the relative position change information between the face and the camera angle). Based on the relative position change information, non-speech features expressing the face position can be obtained, which can be represented by a 3D space transformation parameter matrix or other parameters. To facilitate distinction, the non-speech features are referred to as the third non-speech features.

In one embodiment, the observation data may further include anatomical facial observation data expressed through images. For this anatomical facial observation data, the electronic device can extract the corresponding non-speech features through the following process: based on a correlation with appearance, separating the anatomical facial observation data to obtain fourth non-speech features that express facial appearance.

It can be understood that images usually contain information unrelated to appearance, such as head posture and facial expressions. In fact, this information overlaps with the head movement observation data mentioned earlier. Based on this, the electronic device can remove information unrelated to appearance through pre-trained facial representation to obtain non-speech features that express facial appearance. To facilitate distinction, this non-speech feature is recorded as the fourth speech feature. Through the process above, subsequent problems such as training overfitting can be reduced to a certain extent.

In one embodiment, the extracted speech features may specifically include: linguistic features and paralinguistic features. Linguistic features refer to content (language)-related information contained in single-modal speech data, including but not limited to phonemes, pauses and duration, which mainly affect the lip movement information in the visual modality. Paralinguistic features refer to information contained in single-modal speech data that is independent of content (language), including but not limited to energy, emotion, rhythm and timbre, which are mainly related to facial expressions and head motion when speaking.

In one embodiment, the method described above may further include, before step S103, aligning the speech features and the non-speech features on a time dimension.

Based on the different characteristics of the two types of data, speech data and observation data, there are usually differences in the sampling rates of the two types of data. Generally, the sampling rate of speech data will be greater than the sampling rate of observation data. For example, the speech data may have a sampling rate of 16 kHz (i.e., sampled 16,000 times per second), while observation data may have a sampling rate of 25 frames per second (i.e., sampled 25 frames per second). Based on this, before temporal modeling, speech features and non-speech features can be synchronized first, that is, the two types of data are aligned on the time dimension. Subsequently, when the electronic device performs temporal modeling operations, it can use the aligned speech features and the first non-speech features as modeling objects. Specifically, the aligned speech features and the first non-speech features are fused to obtain the fused features, and the fused features are then input into the autoregressive temporal model to obtain the low-dimensional features.

In some examples, in the case where the sampling rate of the speech data is an integer multiple of the sampling rate of the observation data, the electronic device may, on the time dimension, align the speech features and non-speech features by downsampling speech features or upsampling non-speech features. In other examples, the electronic device can also directly align speech features and non-speech features through data-driven attention models. The embodiments of the present disclosure do not limit the alignment methods.

In some examples, the autoregressive temporal model can be expressed as the following equation: $h_i = \sigma(Wh_{i-1} + Ux_i)$, where $h_i$ represents the low-dimensional representations at time i; $h_{i-1}$ represents the low-dimensional representations at time i−1; $x_i$ represents the input at time i, that is, the fused speech feature and the first non-speech feature; W and U represent the matrices of the temporal model; σ represents nonlinear functions such as sigmoid. Generally, the low-dimensional representations at time 0 can be defined as a constant based on experience, such as 0. It can be seen from the equation that the low-dimensional representations $h_t$ at time t depends on the low-dimensional representations $h_{t-1}$ before time t.

It should be noted that the equation above is a simplified expression of the autoregressive temporal model. In actual application scenarios, models such as Long Short-Term Memory (LSTM) or Gated Recurrent Unit (GRU) can be used, and the present disclosure does not impose any restrictions on this.

In some examples, video synthesis can be expressed as the following equation: $y_i = Vh_i$, where V represents a neural network, which can be specifically a deconvolution network, capable of mapping low-dimensional representations to the high-dimensional image domain; $h_i$ represents the low-dimensional representations of time i; $y_i$ represents the synthesis result of the talking head video frame corresponding to time i.

In actual application scenarios, when the graphics processor of the electronic device has large-scale parallel computing capabilities, parallel inference can be achieved. For example, K low-dimensional representations are obtained through autoregressive temporal modeling in one go, and then the K low-dimensional features are simultaneously inferred through the neural network, thereby obtaining K talking head video frames at the same time.

As seen above, in the embodiments of the present disclosure, for non-speech features with first sensitivity to temporal changes, they are modeled in the low-dimensional space along with speech features, which are also sensitive to temporal changes. For non-speech features with second sensitivity to temporal changes, they are processed only in high-dimensional space for video synthesis. Through this approximation, the complexity of temporal modeling is reduced, thereby improving the inference speed of talking head video synthesis and reducing synthesis time.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Corresponding to the method described above, a talking head video synthesis device 2 is provided. The device 2 can be integrated into the electronic device 110. Referring to FIG. 3, the device 2 may include an acquisition module 201, an extraction module 202, a modeling module 203, and a synthesis module 204.

The acquisition module 201 is to obtain speech data to be synthesized and observation data. The observation data is data obtained through observation other than the speech data. The extraction module 202 is to perform feature extraction on the speech data to obtain speech features corresponding to the speech data, and perform feature extraction on the observation data to obtain non-speech features corresponding to the observation data. The modeling module 203 is to perform temporal modeling on the speech features and first non-speech features to obtain low-dimensional representations. The first non-speech features are non-speech features with first sensitivity to temporal changes. The synthesis module 204 is to perform video synthesis based on the low-dimensional representations and second non-speech features. The second non-speech features are non-speech features with second sensitivity to temporal changes. The second sensitivity is less than the first sensitivity.

In one embodiment, the observation data includes head movement observation data expressed through video. The extraction module 202 may include a first acquisition unit and a second acquisition unit. The first acquisition unit is to analyze the video to obtain information on relative positional changes between a human face and a camera angle. The second acquisition unit is to obtain third non-speech features expressing a position of the human face based on the information.

In one embodiment, the observation data includes anatomical facial observation data expressed through images. The extraction module 202 may further include a third acquisition unit. The third acquisition unit is to, based on a correlation with appearance, separate the anatomical facial observation data to obtain fourth non-speech features that express facial appearance.

In one embodiment, the speech features include linguistic features and paralinguistic features.

In one embodiment, the device 2 may further include an alignment module that is to align the speech features and the non-speech features on a time dimension.

In one embodiment, the alignment module aligns the speech features and the non-speech features on the time dimension by downsampling the speech features or upsampling the non-speech features.

As seen above, in the embodiments of the present disclosure, for non-speech features with first sensitivity to temporal changes, they are modeled in the low-dimensional space along with speech features, which are also sensitive to temporal changes. For non-speech features with second sensitivity to temporal changes, they are processed only in high-dimensional space for video synthesis. Through this approximation, the complexity of temporal modeling is reduced, thereby improving the inference speed of talking head video synthesis and reducing synthesis time.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/ terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for synthesizing a talking head video, the method comprising:

obtaining speech data to be synthesized and observation data, wherein the observation data is data obtained through observation other than the speech data;

performing feature extraction on the speech data to obtain speech features corresponding to the speech data, and performing feature extraction on the observation data to obtain non-speech features corresponding to the observation data;

performing temporal modeling on the speech features and first non-speech features to obtain low-dimensional representations, wherein the first non-speech features are non-speech features with first sensitivity to temporal changes in the non-speech features corresponding to the observation data, and are set as shape-related features; and performing video synthesis based on the low-dimensional representations and second non-speech features, wherein the second non-speech features are non-speech features with second sensitivity to temporal changes in the non-speech features corresponding to the observation data, and are set as texture-related features, and wherein the first sensitivity is greater than the second sensitivity;

wherein performing the temporal modeling on the speech features and the first non-speech features to obtain the low-dimensional representations comprises:

fusing the speech features and the first non-speech features; and obtaining the low-dimensional representations by using an autoregressive temporal model to perform the temporal modeling based on the fused speech features and the first non-speech features starting from frame 0, wherein appearance-related features are used as one of the inputs of the autoregressive temporal model; and wherein performing video synthesis based on the low-dimensional representations and second non-speech features comprises:

obtaining multiple low-dimensional representations through the autoregressive temporal modeling; and inferring the multiple low-dimensional representations simultaneously through a neural network to obtain multiple talking head video frames at the same time, wherein the neural network comprises a deconvolution network for mapping the low-dimensional representations to a high-dimensional image domain.

2. The method of claim 1, wherein the observation data comprises head movement observation data expressed through video, and performing feature extraction on the observation data to obtain non-speech features corresponding to the observation data comprises:

analyzing the video to obtain information on relative positional changes between a human face and a camera angle; and obtaining third non-speech features expressing a position of the human face based on the information.

3. The method of claim 1, wherein the observation data comprises anatomical facial observation data expressed through images, and performing feature extraction on the observation data to obtain non-speech features corresponding to the observation data comprises:

based on a correlation with appearance, separating the anatomical facial observation data to obtain fourth non-speech features that express facial appearance.

4. The method of claim 1, wherein the speech features comprise linguistic features and paralinguistic features;

wherein the linguistic features refer to content-related information contained in the speech data; and wherein the paralinguistic features refer to information contained in the speech data that is independent of the content, and are related to facial expressions and head motion when speaking.

5. The method of claim 1, further comprising, before performing temporal modeling on the speech features and first non-speech features to obtain the low-dimensional representations, aligning the speech features and the non-speech features on a time dimension.

6. The method of claim 5, wherein aligning the speech features and the non-speech features on the time dimension comprises:

on the time dimension, aligning the speech features and the non-speech features by downsampling the speech features or upsampling the non-speech features.

7. The method of claim 1, wherein the observation data is obtained based on a video of a real head of a desired target with a visual sensor, and the video of the real head comprises: data related to head movement, or, data related to appearance and the data related to head movement.

8. An electronic device for synthesizing a talking head video, comprising:

one or more processors; and a memory coupled to the one or more processors, the memory storing programs that, when executed by the one or more processors, cause performance of operations comprising:

obtaining speech data to be synthesized and observation data, wherein the observation data is data obtained through observation other than the speech data;

performing feature extraction on the speech data to obtain speech features corresponding to the speech data, and performing feature extraction on the observation data to obtain non-speech features corresponding to the observation data;

performing temporal modeling on the speech features and first non-speech features to obtain low-dimensional representations, wherein the first non-speech features are non-speech features with first sensitivity to temporal changes in the non-speech features corresponding to the observation data, and are set as shape-related features; and performing video synthesis based on the low-dimensional representations and second non-speech features, wherein the second non-speech features are non-speech features with second sensitivity to temporal changes in the non-speech features corresponding to the observation data, and are set as texture-related features, and wherein the first sensitivity is greater than the second sensitivity;

wherein performing the temporal modeling on the speech features and the first non-speech features to obtain the low-dimensional representations comprises:

fusing the speech features and the first non-speech features; and obtaining the low-dimensional representations by using an autoregressive temporal model to perform the temporal modeling based on the fused speech features and the first non-speech features starting from frame 0, wherein appearance-related features are used as one of the inputs of the autoregressive temporal model; and wherein performing video synthesis based on the low-dimensional representations and second non-speech features comprises:

obtaining multiple low-dimensional representations through the autoregressive temporal modeling; and inferring the multiple low-dimensional representations simultaneously through a neural network to obtain multiple talking head video frames at the same time, wherein the neural network comprises a deconvolution network for mapping the low-dimensional representations to a high-dimensional image domain.

9. The electronic device of claim 8, wherein the observation data comprises head movement observation data expressed through video, and performing feature extraction on the observation data to obtain non-speech features corresponding to the observation data comprises:

analyzing the video to obtain information on relative positional changes between a human face and a camera angle; and obtaining third non-speech features expressing a position of the human face based on the information.

10. The electronic device of claim 8, wherein the observation data comprises anatomical facial observation data expressed through images, and performing feature extraction on the observation data to obtain non-speech features corresponding to the observation data comprises:

based on a correlation with appearance, separating the anatomical facial observation data to obtain fourth non-speech features that express facial appearance.

11. The electronic device of claim 8, wherein the speech features comprise linguistic features and paralinguistic features.

12. The electronic device of claim 8, wherein the operations further comprise, before performing temporal modeling on the speech features and first non-speech features to obtain the low-dimensional representations, aligning the speech features and the non-speech features on a time dimension.

13. The electronic device of claim 12, wherein aligning the speech features and the non-speech features on the time dimension comprises:

on the time dimension, aligning the speech features and the non-speech features by downsampling the speech features or upsampling the non-speech features.

14. A non-transitory computer-readable storage medium storing instructions that, when executed by at least one processor of an electronic device, cause the at least one processor to perform a method, the method comprising:

obtaining speech data to be synthesized and observation data, wherein the observation data is data obtained through observation other than the speech data;

performing feature extraction on the speech data to obtain speech features corresponding to the speech data, and performing feature extraction on the observation data to obtain non-speech features corresponding to the observation data;

performing temporal modeling on the speech features and first non-speech features to obtain low-dimensional representations, wherein the first non-speech features are non-speech features that are sensitive to temporal changes in the non-speech features corresponding to the observation data, and are set as shape-related features; and performing video synthesis based on the low-dimensional representations and second non-speech features in the non-speech features corresponding to the observation data, and are set as texture-related features, and wherein the second non-speech features are non-speech features insensitive to temporal changes;

wherein performing the temporal modeling on the speech features and the first non-speech features to obtain the low-dimensional representations comprises:

fusing the speech features and the first non-speech features; and obtaining the low-dimensional representations by using an autoregressive temporal model to perform the temporal modeling based on the fused speech features and the first non-speech features starting from frame 0, wherein appearance-related features are used as one of the inputs of the autoregressive temporal model; and wherein performing video synthesis based on the low-dimensional representations and second non-speech features comprises:

obtaining multiple low-dimensional representations through the autoregressive temporal modeling; and inferring the multiple low-dimensional representations simultaneously through a neural network to obtain multiple talking head video frames at the same time, wherein the neural network comprises a deconvolution network for mapping the low-dimensional representations to a high-dimensional image domain.

15. The non-transitory computer-readable storage medium of claim 14, wherein the observation data comprises head movement observation data expressed through video, and performing feature extraction on the observation data to obtain non-speech features corresponding to the observation data comprises:

analyzing the video to obtain information on relative positional changes between a human face and a camera angle; and obtaining third non-speech features expressing a position of the human face based on the information.

16. The non-transitory computer-readable storage medium of claim 14, wherein the observation data comprises anatomical facial observation data expressed through images, and performing feature extraction on the observation data to obtain non-speech features corresponding to the observation data comprises:

based on a correlation with appearance, separating the anatomical facial observation data to obtain fourth non-speech features that express facial appearance.

17. The non-transitory computer-readable storage medium of claim 14, wherein the speech features comprise linguistic features and paralinguistic features.

18. The non-transitory computer-readable storage medium of claim 14, wherein the method further comprises, before performing temporal modeling on the speech features and first non-speech features to obtain the low-dimensional representations, aligning the speech features and the non-speech features on a time dimension.

19. The non-transitory computer-readable storage medium of claim 18, wherein aligning the speech features and the non-speech features on the time dimension comprises:

on the time dimension, aligning the speech features and the non-speech features by downsampling the speech features or upsampling the non-speech features.

* * * * *